(12) United States Patent
Sala Prat et al.

(10) Patent No.: US 6,513,461 B2
(45) Date of Patent: Feb. 4, 2003

(54) DEVICE FOR HELPING NEWBORN LIVESTOCK TO WALK

(76) Inventors: Josep Sala Prat, Enrique Granados, n°3, 25270-Sant Guim De Freixenet, Lerida (ES); Nuria Marce Anglarill, Enrique Granados, n°3, 25270-Sant Guim De Freixenet, Lerida (ES)

( * ) Notice: Subject to any disclaimer, the term of this patent is extended or adjusted under 35 U.S.C. 154(b) by 0 days.

(21) Appl. No.: 09/907,963

(22) Filed: Jul. 19, 2001

(65) Prior Publication Data

US 2002/0014211 A1 Feb. 7, 2002

(30) Foreign Application Priority Data

Jul. 19, 2000 (ES) ................................. 0001937

(51) Int. Cl.$^7$ ............................................. A01K 27/00
(52) U.S. Cl. ..................... 119/856; 119/725; 119/702
(58) Field of Search ................... 119/702, 725, 119/726, 856, 865

(56) References Cited

U.S. PATENT DOCUMENTS

| | | | | |
|---|---|---|---|---|
| 1,508,601 A | * | 9/1924 | Huff | |
| 2,670,712 A | * | 3/1954 | Patience et al. | 54/71 |
| 3,717,128 A | * | 2/1973 | Pearman et al. | 119/103 |
| 4,328,533 A | * | 5/1982 | Paredes | 362/108 |
| 4,528,944 A | * | 7/1985 | Reed et al. | 119/29 |
| 4,633,817 A | * | 1/1987 | Taylor | 119/96 |
| 5,643,159 A | * | 7/1997 | Iavarone | 482/125 |
| 5,913,285 A | * | 6/1999 | Pritchard | 119/771 |

* cited by examiner

*Primary Examiner*—Charles T. Jordan
*Assistant Examiner*—Bret Hayes
(74) *Attorney, Agent, or Firm*—Staas & Halsey LLP

(57) ABSTRACT

A harness device for assisting livestock to stand, including a dorsal band with a first, front end and a second rear end. An adhesive surface and a thin neck strip are attached to the first end. At the second end of the band are two elastic pieces, each of which includes adjustable ankle attachments in the form of transverse self-adhesive strips. A related method includes placing the band on the animal's back, with the front end of the band toward the front of the animal, and the second end of the band toward the rear of the animal, extending the neck strip about the neck of the animal and removably attaching same via the adhesive surface at the first end of the band, extending the first and second elastic members along the legs of the animal, and removably attaching, respectively, the first and second attachments about ankles of the animal.

11 Claims, 1 Drawing Sheet

DEVICE FOR HELPING NEWBORN LIVESTOCK TO WALK

BACKGROUND OF THE INVENTION

It is well known that the likelihood newborn livestock or four-footed animals will survive, especially in large litters, depends on proper feeding. A certain number of newborn animals is unable to stand up on their hind legs and cannot walk. They place their forelegs on the ground, but sit down and leave their hind legs stretched forward. Therefore they cannot walk and reach their mother's teats in order to feed. Animals that attain early mobility hold an advantage over those that cannot move about, and which may die of starvation. On farms and livestock ranches, this means a decline in yield from loss of part of the litter.

The present invention is directed to a harness device for helping newborn livestock to walk. More specifically, the harness is adapted to be fitted to newborn livestock, by placement between the neck and rear legs of the animal, which stretches the rear legs backward, allowing the young animal to stand.

SUMMARY OF THE INVENTION

Accordingly, it is an object of the present invention to provide a device for helping newborn livestock to walk.

It is another object of the present invention to provide a harness to facilitate early walking of livestock, which harness is relatively easy to apply to a young animal.

It is another object of the present invention to provide a harness for facilitating a young animal to walk, which harness does not require connection to any external device, and does not otherwise inhibit the animal's ability to move about.

It is another object of the present invention to provide a brightly-colored harness for an animal, to facilitate identifying those animals wearing such a harness.

It is another object of the present invention to provide a method for relatively easily applying a harness to an animal, which harness helps the animal stand at an early age.

To achieve the foregoing and other objects of the present invention, there is provided a harness that easily fits a newborn four-legged animal, making it possible for the animal to stand up on all four legs, thereby allowing it to walk. The harness includes a dorsal band with a first, front end and a second, rear end. An adhesive surface and a thin neck strip are formed at the first end. At the second end of the band is connected first and second elastic pieces, each respectively receiving first and second adjustable ankle attachments, preferably transverse self-adhesive strips.

The method invention includes the steps of applying the harness to the animal by placing the band on the animal's back, with the front end of the bank being located toward the front of the animal, and the rear end of the band being located toward the rear of the animal, placing the strip extending from the first end about the neck of the animal, removably attaching the strip via connection at the first end, placing the first and second elastic members along the legs of the animal, and removably attaching, respectively, the first attachment and the second attachment about ankles of the animal.

Other features and advantages of the present invention will be apparent from the following description taken in conjunction with the accompanying drawings, in which like reference characters designate the same or similar parts throughout the figure thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Figure 1:
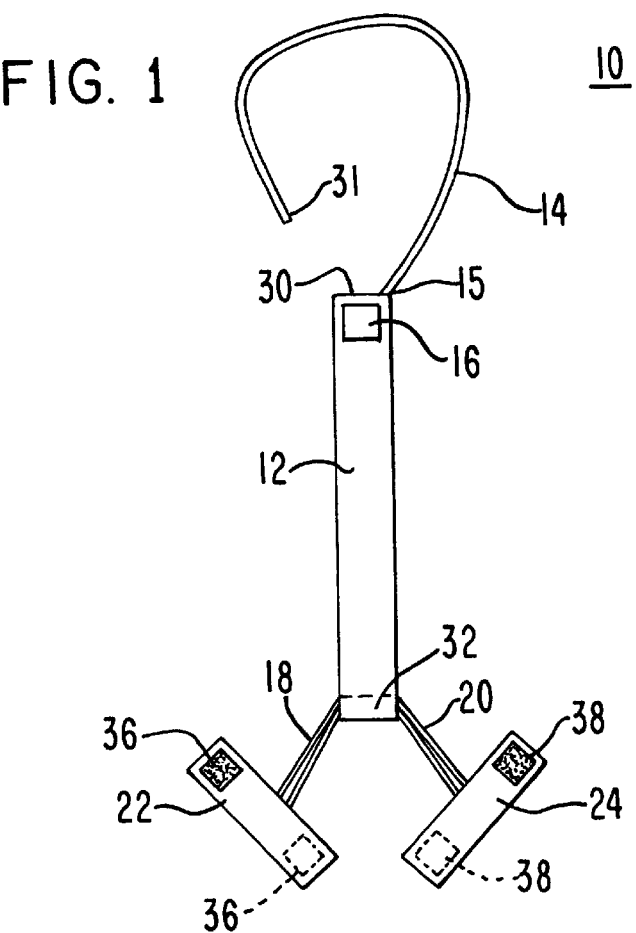
FIG. 1 is a top plan view of the device.
Figure 2:
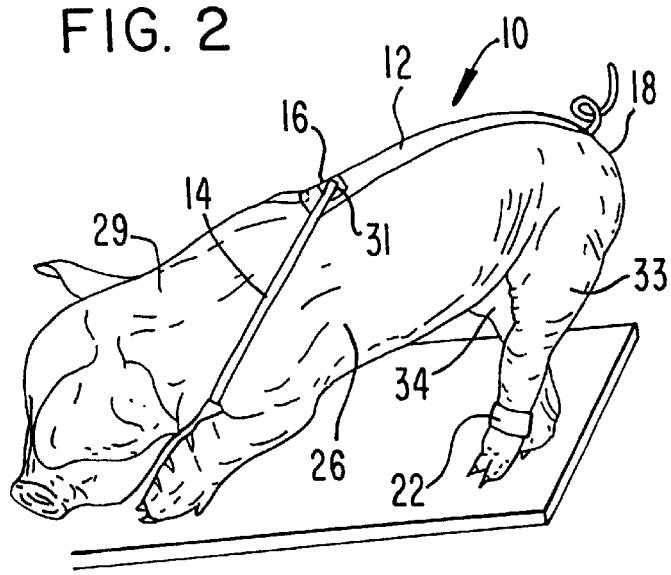
FIG. 2 is a side perspective view of an animal fitted with the device.
Figure 3:
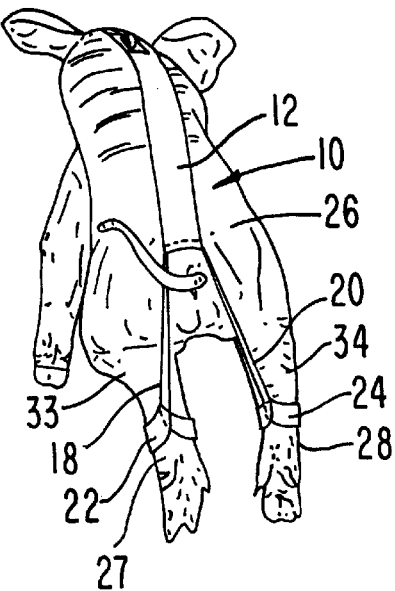
FIG. 3 is a rear perspective view of an animal fitted with the device.

The preferred embodiments of the present invention will now be described with reference to FIGS. 1–3.

The device is a harness 10, and includes preferably an elongated, dorsal band 12 having a first, front end 30 and a second, rear end 32.

An adhesive area 16 is formed at the front end of the band 12. An elongated, thin neck strip 14 has one end 15 fixedly connected to the first end 30 of the band 12.

At a rear end 32 of the band 12 are fixedly connected two extensions or elastic members 18, 20. The members 18, 20 can take the form of a plurality of elastic members received in a stitched over, second end 32, as shown in FIG. 1, so that the free ends thereof extend oppositely from the second end 32.

Each elastic member 18, 20 includes at the free ends thereof an adjustable ankle attachment 22, 24, each preferably in the form of a transverse self-adhesive strip. More particularly, each of these attachments 22, 24 preferably includes adhesive strips 36, 38, and is capable of surrounding each ankle 27, 28 of the animal 26.

The adhesive strips 36, 38 are preferably VELCRO®, a synthetic material sold in ribbon, sheet, or piece goods form, having complementary parts which adhere to each other when pressed together and adapted for use as a closure fastener, namely, a hook and loop-type fastener.

The thin strip 14 at the first end 30 is to be placed around the neck 29 of an animal 26 and attached to the first end 30 by the adhesive area 16 formed on the first end 30 of the band 12. Again, the connection between the free end 31 of the strip 14 and the adhesive area 16 is preferably a hook and loop-type arrangement, but could be another removable connection known in the art.

The dorsal band 12 is connected to the animal, at its second, rear end 32, by adjustably connecting a respective one of the attachments 22, 24 on the ankles 27, 28 of the hind legs 33, 34 of the animal 26.

The attachments 22, 24 pull on the ankles 27, 28 due to the effect of the elastic pieces 18, 20 at the rear of the animal's body. That is, the elastic pieces 18, 20 connected between the second end 32 of the dorsal band 12 and the respective attachments 22, 24 around the ankle 27, 28 pull the ankles 27, 28 backward, placing tension on the hind legs 33, 34 and preventing them from folding forward. The thin strip 14 around the neck 29 of the animal 26 assists in holding the harness 12 firmly on the animal, and provides a counter-force to the elastic members 18, 20.

The harness 10 is preferably made of a bright color for easy identification of those animals on which the device has been placed.

Applying the harness 10 includes the following steps: each attachment 22, 24 is placed around the ankles 27, 28 of the hind legs 33, 34, securing them with the adhesive strips 36, 38 and seeing that the elastic pieces 18, 20 remain on the rear face of the legs 33, 34 and thighs. The hind legs 33, 34 are then pulled backward and the dorsal band 12 is placed on the back of the animal 26. Thin strip 14 is then placed around the neck 29 of the animal 26, and the free end 31 thereof is removably attached to the adhesive area 16 of the first end 30 of the band 12 via hook and loop fastening. Any remaining excess of the strip 14 can be cut off, if desired.

Having been fitted with the harness 10, the animal 26 stretches its hind legs 33, 34 vertically. During this movement, the elastic pieces 18, 20 joining the dorsal band 12 and each of the ankle attachments 22, 24 tighten until a balance is reached with the force pushing the rear legs 33, 34 outward. This balance should be made to coincide with the normal angle the rear legs 33, 34 form with the trunk, i.e., as closely as possible to the angle the animal should assume when it is standing on all four legs.

The present invention provides at least the following advantages. First, newborn animals that cannot walk by themselves are endowed with mobility, especially those that find it impossible to stand up and walk, thereby preventing them from dying because they are unable to reach food. Animals that have been fitted with the device can reach their mother and suckle. The device is self-contained, i.e., does not need to be supported by any external means, which further aids in the animal's mobility. Also, when the harness is made of a bright color, those animals wearing same can be easily identified, to check on their progress, etc. Livestock raisers also enjoy these advantages, with the assurance that a high percentage of their herds and litters survive The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to that fall within the scope of the invention and the appended claims.

What is claimed is:

1. A device for assisting an animal to stand, comprising:
   a harness having
   a band with a first, front end and a second, rear end, said band being placed on the animal's back,
   a strip extending from the first end for extending about the neck of the animal, said strip being removably attached via a connection to the first end when extending about the neck of the animal,
   first and second elastic members extending from the second end of the band and along the rear of the animal, and
   a first attachment connected to the first elastic member and a second attachment connected to the second elastic member, each of said attachments being removably attached about a rear ankle of the animal to tension the rear legs of the animal rearward.

2. The device as recited in claim 1, wherein the connection between the strip and the band is a self-adhesive member having hook and loop type fasteners.

3. The device as recited in claim 1, wherein each attachment is removably attached via a self-adhesive member having hook and loop type fasteners.

4. The device as recited in claim 1, wherein the band is an elongated, non-elastic member.

5. The device as recited in claim 4, wherein the strip is an elongated, elastic member.

6. The device as recited in claim 1, wherein at least a portion of the device is brightly colored.

7. A device for assisting an animal to stand, comprising:
   a harness having
   a band with a first, front end and a second, rear end, said band being elongated and non-elastic and being placed on the animal's back,
   an elongated, elastic strip extending from the first end for extending about the neck of the animal, said strip being removably attached via a connection to the first end when extending about the neck of the animal.
   first and second elastic members extending from the second end of the band and along the rear of the animal, and
   a first attachment connected to the first elastic member and a second attachment connected to the second elastic member, each of said attachments being removably attached about a rear ankle of the animal to tension the rear legs of the animal rearward.

8. The device as recited in claim 7, wherein the connection between the strip and the band is a self-adhesive member having hook and loop type fasteners.

9. The device as recited in claim 8, wherein each ankle attachment is removably attached via a self-adhesive member having hook and loop type fasteners.

10. The device as recited in claim 9, wherein at least a portion of the device is brightly colored.

11. A method for assisting an animal to stand, comprising the following steps:
    applying a harness to the animal by the following substeps
    placing a band with first, end and a, rear end on the amimal's back, with the front end of the band being located at the front of the animal, and the second end being located at the rear of the animal,
    placing a strip with one end fixedly extending from the first end about the neck of the animal, with a second end of the strip being removably attached to the band via a connection at the first end of the band,
    extending first and second elastic members from the second end of the band along the rear of the animal,
    providing, respectively, a first attachment connected to the first elastic member and a second attachment connected to the second elastic member, and
    removably attaching, respectively, the first and second attachments to the rear ankles of the animal, thereby tensioning the rear legs of the animal rearward.

* * * * *